United States Patent
Lamance et al.

(10) Patent No.: US 7,463,617 B2
(45) Date of Patent: Dec. 9, 2008

(54) MITIGATION OF CDMA CROSS-CORRELATION ARTIFACTS AND IMPROVEMENT IN SIGNAL-TO-NOISE RATIO IN TDMA LOCATION NETWORKS

(76) Inventors: James Lamance, c/- Locata Corporation, 401 Clunies Ross St, Acton, A.C.T. (AU) 2601; David Small, c/- Locata Corporation, 401 Clunies Ross St, Acton, A.C.T. (AU) 2601

( * ) Notice: Subject to any disclaimer, the term of this patent is extended or adjusted under 35 U.S.C. 154(b) by 374 days.

(21) Appl. No.: 10/565,874

(22) PCT Filed: Aug. 3, 2004

(86) PCT No.: PCT/AU2004/001025
§ 371 (c)(1),
(2), (4) Date: Jan. 24, 2006

(87) PCT Pub. No.: WO2005/013633
PCT Pub. Date: Feb. 10, 2005

(65) Prior Publication Data
US 2007/0058591 A1   Mar. 15, 2007

(30) Foreign Application Priority Data
Aug. 4, 2003 (AU) ................. 2003904045

(51) Int. Cl.
*H04B 7/212* (2006.01)
*H04B 7/216* (2006.01)
*H04B 1/00* (2006.01)
*H04J 3/06* (2006.01)

(52) U.S. Cl. .................... 370/347; 370/335; 370/337; 370/350; 370/515; 375/150

(58) Field of Classification Search ............ 370/310, 370/312–314, 335–338, 341–342, 345, 347, 370/350, 264–265, 267, 277, 280, 294, 301, 370/304–305, 324, 332, 512–515, 519–520; 455/404.2, 456.1–456.6, 457, 463, 466, 552.1, 455/550.1, 556.2, 560–561; 375/145–150, 375/240.28, 363–370, 354–355
See application file for complete search history.

(56) References Cited

U.S. PATENT DOCUMENTS

| | | | | |
|---|---|---|---|---|
| 5,680,414 A * | 10/1997 | Durrant et al. | ............... | 375/206 |
| 5,910,948 A * | 6/1999 | Shou et al. | ................... | 370/335 |
| 6,101,178 A * | 8/2000 | Beal | ........................... | 370/336 |
| 6,163,696 A * | 12/2000 | Bi et al. | ....................... | 455/436 |
| 6,370,160 B1 * | 4/2002 | Knutson et al. | ............. | 370/503 |
| 6,493,360 B1 * | 12/2002 | Nishmura | ................... | 370/514 |
| 6,546,026 B1 * | 4/2003 | Goeddel | ..................... | 370/513 |
| 6,847,619 B2 * | 1/2005 | Zscheile et al. | ............. | 370/322 |

* cited by examiner

Primary Examiner—Meless N Zewdu

(57) ABSTRACT

A correlation system for Time Division Multiple Access (TDMA) positioning systems is disclosed, whereby a position receiver acquires, tracks, and demodulates a plurality of Code Division Multiple Access (CDMA) modulated positioning signals are pulsed in a Time Division Multiple Access (TDMA) scheme. A specialized correlation processor within the position receiver is configured to internally generate pseudo-random number (PRN) code signal replicas of Code Division Multiple Access (CDMA) positioning signals in synchronicity with their respectively received Time Division Multiple Access (TDMA) positioning signals. This correlation system provides the position receiver with range measurements free from the deleterious effects of Code Division Multiple Access (CDMA) cross-correlation artifacts and degraded signal-to-noise ratios, therefore allowing the computation of high accuracy position solutions.

4 Claims, 2 Drawing Sheets

MITIGATION OF CDMA CROSS-CORRELATION ARTIFACTS AND IMPROVEMENT IN SIGNAL-TO-NOISE RATIO IN TDMA LOCATION NETWORKS

FIELD OF THE INVENTION

The present invention relates generally to systems and methods for generating precise range determination in radiolocation systems. In particular, the present invention relates to the mitigation of pseudorandom code cross-correlation artifacts and the improvement of signal-to-noise ratios in Code Division Multiple Access (CDMA) positioning signals that are pulsed in a Time Division Multiple Access (TDMA) scheme.

BACKGROUND TO THE INVENTION

Many radiolocation systems utilize multiple transmitters, each transmitting a continuous unique code division multiple access (CDMA) signal. A CDMA receiver generally tracks these signals using a plurality of receiver channels, each normally containing two or more correlators, to determine the range to each of the transmitters. Traditional CDMA receivers continuously correlate against these continuous CDMA signals. Some prior art positioning receivers sequence a single receive channel across a plurality of continuous CDMA signals. The purpose of the sequencing receiver is to reduce the hardware cost and power consumption of the position receiver.

Not all CDMA based radiolocation systems broadcast continuous signals. When the broadcast CDMA positioning signals are all expected to arrive at a position receiver with similar signal power, then continuous CDMA positioning signals are typically used. However, when the broadcast CDMA positioning signals are received with disparate signal powers, the continuous CDMA positioning signals from the higher signal power transmitters distort the signals received from the lower signal power transmitters. To separate the CDMA positioning signals under these conditions, the CDMA positioning signals may be further separated using either a frequency separation, the so-called Frequency Division Multiple Access (FDMA), in addition to the CDMA separation. Alternatively, the CDMA positioning signals may be further separated using a time division separation, the so-called Time Division Multiple Access (TDMA), in addition to the CDMA separation.

Some radiolocation systems transmit CDMA positioning signals on the same frequency in a pulsed time division multiple access (TDMA) scheme to mitigate the so-called near/far problem. CDMA positioning signals have a specific dynamic range that separates two unique continuous CDMA positioning signals, and this dynamic range is determined by the length of the pseudo random number (PRN) code used to generate the CDMA positioning signal. A near/far problem is produced when one or more of the continuous CDMA positioning signals exceed this dynamic range relative to any other CDMA positioning signal and hence a position receiver cannot distinguish between the two CDMA positioning signals. Additionally, if one or more of the continuous CDMA positioning signals exceed this dynamic range, the radio frequency (RF) front-end of the receiver may become saturated. This situation is most commonly brought about when the CDMA signal transmitters broadcast at the same power levels, but are at disparate ranges relative to the position receiver. The disparate ranges result in varying free space signal power loss, as seen at the position receiver, with signal from the near transmitter being observed as stronger than the signal broadcast from a far transmitter, therefore resulting in the term near/far to describe the problem.

The Radio Technical Commission for Maritime (RTCM) defines one common TDMA broadcasting scheme for a CDMA positioning system. The Radio Technical Commission for Maritime (RTCM) broadcasting scheme divides the 1 millisecond period of the Global Positioning System (GPS) Coarse Acquisition (C/A) code into 11 equal TDMA time slots, each time slot $\frac{1}{11}$ of a millisecond in duration. During each millisecond, each transmitter occupies a single TDMA time slot within the millisecond. For subsequent millisecond intervals, the sub-millisecond TDMA time slot assignment is changed based on a predetermined pseudorandom sequence. When each transmitter is represented within a specific time period in the TDMA broadcasting scheme, 1 millisecond in this example, this period is termed the TDMA sub-sequence repeat period. The entire Radio Technical Commission for Maritime (RTCM) broadcasting scheme repeats in its entirety every 200 milliseconds, and is termed a full sequence TDMA repeat period.

Signal-to-noise ratios (SNR) are compromised when a position receiver continuously correlates against TDMA positioning signals. When a position receiver continuously correlates against a TDMA positioning signal, a portion of the correlation time includes the desired TDMA positioning signal, known as the on-pulsed time. During the remainder of the correlation time, known as the off-pulsed time, the received positioning signals do not include the desired signal. During these off-pulsed times, the position receiver is correlating against other TDMA positioning signals and noise, not the desired TDMA positioning signal. Continuously correlating during the off-pulsed times increases the noise brought into the position receiver correlation process without increasing the received signal. Because noise is added to the correlation when the desired signal is not present, the SNR is decreased.

CDMA cross-correlation increases when a position receiver continuously correlates against TDMA positioning signals. CDMA cross-correlation is when two or more CDMA positioning signals, within the dynamic range of the position receiver, are mutually coupled within the correlation process due to the limited dynamic range of the CDMA code separation. The result of cross-correlation is a distortion of the desired signal's auto-correlation function. In most continuously transmitting CDMA positioning systems, the CDMA cross-correlation distortion is relatively small compared to the CDMA code separation dynamic range. However, in a TDMA positioning system, correlating during the off-pulsed times increases the cross-correlation above the level that would be expected with a continuous signal. This is due to the position receiver correlating against other TDMA positioning signals during the off-pulsed times.

Multi-channel prior art position receivers are designed to work with continuously transmitted CDMA positioning signals. An example of a continuously transmitted CDMA positioning signal is the Global Positioning System (GPS). Multi-channel prior art GPS receivers continuously correlate against the plurality of continuous GPS positioning signals. Alternative prior art position receivers sequence between the continuous CDMA positioning signals using a single channel architecture to reduce the hardware cost and power consumption of the position receivers. Examples of prior art sequencing receivers are disclosed in U.S. Pat. No. 4,468,793, issued Aug. 28, 1984, titled "Global Positioning System (GPS) Multiplexed Receiver" and U.S. Pat. No. 4,8949,961, issued Jul. 18, 1989, titled "Fast Sequencing Demodulation Method and Apparatus." These disclosures teach a single channel receiver architecture that sequences between continuous CDMA positioning signals. These sequencing receivers achieve the stated objects of their invention by reducing receiver channels and hence reducing the cost and power consumption of the receiver. However, prior art sequencing receivers do not include a means for adjusting the sequencing pattern to align to a TDMA broadcasting scheme, and therefore have no means to address the cross-correlation or SNR degradation problems described above.

Prior art TDMA communication receivers transmit TDMA communications signals for increased data throughput to user receivers. Examples of these types of systems are disclosed in U.S. Pat. No. 5,875,402, issued Feb. 23, 1999, titled "Time-synchronous Communication System" and U.S. Pat. No. 5,510,797, issued Apr. 23, 1996, titled "Provision of SPS Timing Signals" and U.S. Pat. No. 5,367,524, issued Nov. 22, 1994, titled "Method for Sequential Data Transmission" and U.S. Pat. No. 6,763,241, issued Jul. 13, 2004, titled "Data Communications Synchronization Using GPS Receiver". These communication systems provide for TDMA synchronization of user receivers utilizing external synchronization techniques, such as those provided by the Global Positioning System (GPS). Using GPS or a similar satellite-based synchronization technique subjects the TDMA communication receivers to the constraints of the satellite system. Further, additional hardware, namely a GPS receiver or equivalent, is required to facilitate the external synchronization procedure.

There is clearly a need for a position receiver that does not require: (a) a plurality of CDMA correlators running continuously to provide measurement data for TDMA positioning signals, (b) to arbitrarily sequence between a set of continuous CDMA signals, (c) to view satellites for TDMA synchronization, and (d) additional hardware, such as Global Navigation Satellite System (GNSS) receivers, that are only used to establish TDMA timing. A position receiver that operates without these constraints is highly desirable. There is also clearly a need for a position receiver that can provide ranging signals free from the deleterious effects of cross-correlation artifacts and low signal-to-noise ratios (SNR) in TDMA location networks. The present invention achieves this desirable goal by transmitting positioning signals in a TDMA broadcasting scheme, chronologically synchronizing a position receiver to the received TDMA positioning signals, and sequentially correlating on received TDMA positioning signals in synchronism with the network TDMA broadcasting scheme.

OBJECTS OF THE INVENTION

It is an object of the present invention to provide a position receiver architecture which mitigates cross-correlation distortion and increases signal-to-noise ratios (SNR) in TDMA positioning signals, achieved by processing TDMA positioning signals in synchronicity with a TDMA broadcast scheme, resulting in accurate range measurements and hence, accurately determined position solutions.

It is a further object of the present invention to provide a position receiver architecture which autonomously synchronizes its correlation process to a TDMA broadcast scheme.

It is a further object of the present invention to provide a position receiver architecture that synchronizes its correlation process to a TDMA broadcast scheme without requiring an external synchronization means.

It is a further object of the present invention to provide a position receiver architecture that efficiently utilizes the receiver hardware to minimize cost and power consumption.

It is a further object of the present invention to provide a pseudo-random number (PRN) code sequence generator that can rapidly modify the PRN code and the PRN code phase within the time available during a TDMA broadcasting scheme transmission time-slot.

It is a further object of the present invention to provide a position receiver architecture that provides continuous code and carrier Digitally Controlled Oscillator (DCO) counter values in a TDMA broadcast scheme without the requirement for continuously running code and carrier Digitally Controlled Oscillators (DCOs).

It is a further object of the present invention to provide a position receiver architecture that provides contiguous integrated carrier phase (ICP) measurements in a TDMA broadcast scheme without requiring continuously running carrier Digitally Controlled Oscillators (DCOs).

SUMMARY OF THE INVENTION

The present invention discloses a system and method to mitigate cross-correlation artifacts and improve signal-to-noise ratios in Code Division Multiple Access (CDMA) modulated signals that are pulsed in a Time Division Multiple Access (TDMA) broadcast scheme. This is achieved using a so-called TDMA correlator engine, implemented within a position receiver. The TDMA correlator engine is chronologically synchronized with the reception of a plurality of TDMA transmissions. Synchronization of the TDMA correlator engine with the reception of the TDMA transmissions is achieved using a so-called TDMA sequence determination means. The TDMA sequence determination means determines the required timing and PRN code sequences within the TDMA correlator engine such that the internally generated signal replicas are synchronized with the received TDMA positioning signals. The TDMA sequence determination means utilizes a so-called master channel timer in conjunction with the TDMA transmissions to establish this synchronization. Additionally, rapid reuse of the TDMA correlator engine on all TDMA time slots efficiently utilizes the position receiver hardware resources.

OVERVIEW

Figure 1:
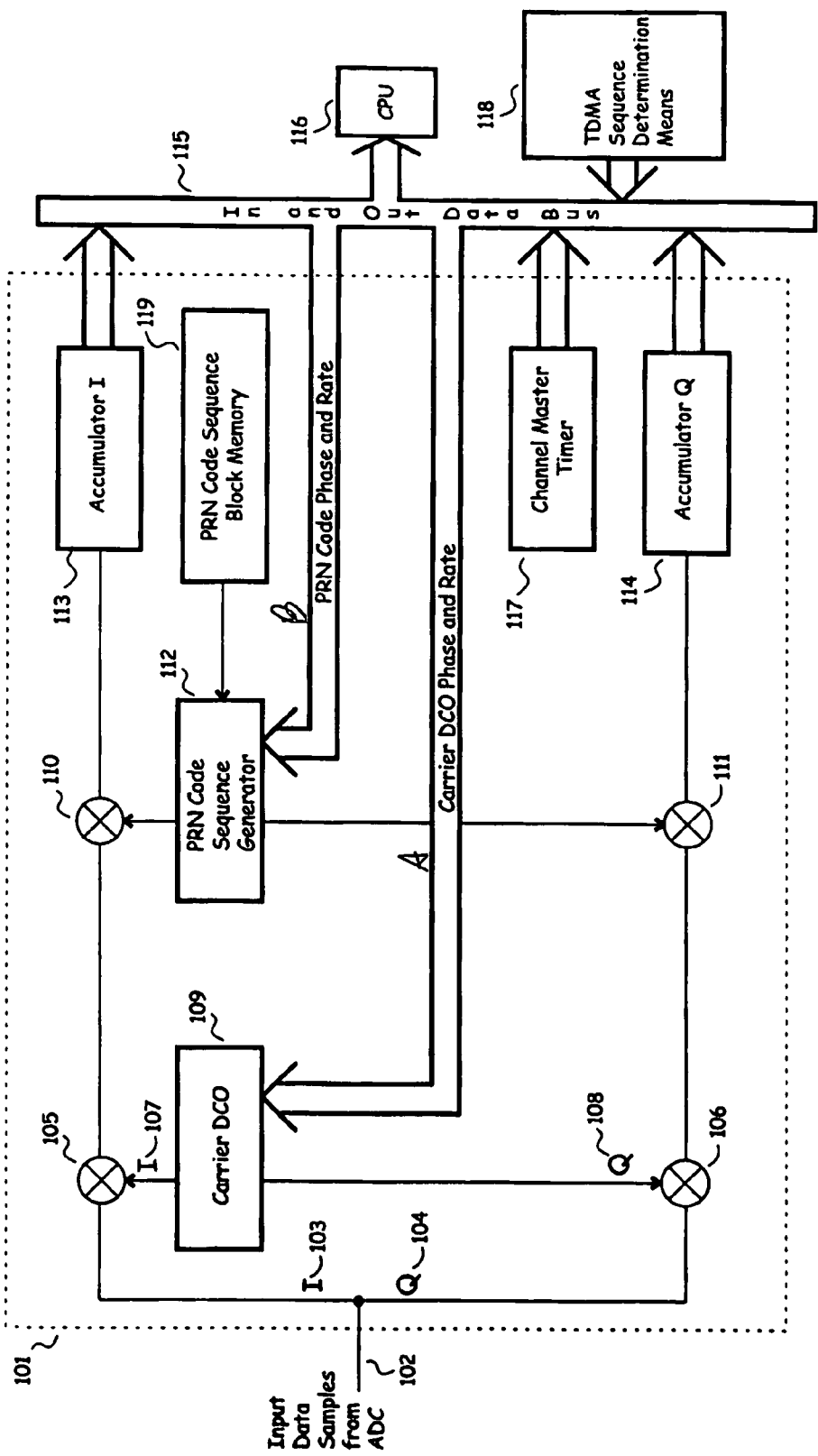
FIG. 1 is a schematic representation of a simplified position receiver channel illustrating a TDMA correlator engine, according to the present invention, incorporating a TDMA Sequence Determination Means, a Channel Master Timer, a PRN Code Sequence Block Memory, and associated components.

A plurality of chronologically synchronized positioning-unit devices, positioned at known locations, transmit positioning signals in a predetermined Time Division Multiple Access (TDMA) sequence, such that each transmitter broadcasts its unique CDMA positioning signal in a specified transmission time slot. A position receiver is configured to receive TDMA positioning signals from the network of positioning-unit devices and determine position, velocity and time (PVT) relative to the positioning-unit device network. In one embodiment, the position receiver is configured with a single receive channel capable of receiving only one positioning signal at any given time. This single receive channel incorporates a rapidly modifiable correlator architecture that replicates a plurality of Code Division Multiple Access (CDMA) correlators. This rapidly modifiable correlator architecture, referred to as a TDMA correlator engine, is capable of correlating on TDMA-pulsed CDMA code sequences in synchronization with the reception of the TDMA positioning signals. The TDMA correlator engine reuses the same correlator circuitry on each subsequently received TDMA positioning signal. In a further embodiment, multiple channel configurations, each channel configured with a TDMA correlator engine, provide simultaneous correlation of TDMA positioning signals that simultaneously arrive at the position receiver. A position receiver configured with a TDMA correlator engine replaces a plurality of continuous CDMA correlators, and is distinguished from prior art receivers by its unique ability to autonomously synchronize with the TDMA reception sequence. This synchronization is achieved using a so-called TDMA sequence determination means which synchronizes the TDMA correlator engine to the signals received from the network of positioning-unit devices.

The TDMA sequence determination means achieves synchronization of the TDMA correlator engine by using a deterministic algorithm based on knowledge of the TDMA broadcasting scheme, positioning-unit device locations, and the network time of the positioning-unit devices. The TDMA correlator engine internal pseudo-random number (PRN) code generator code and code phase, as well as the carrier digitally controlled oscillator (DCO), are synchronously updated to follow the TDMA broadcast sequence of each positioning-unit device transmission, such that a single channel position receiver is capable of correlating only on the currently received PRN code. As the position receiver location changes, the deterministic algorithm considers the change in propagation delay from each positioning-unit device and adjusts the TDMA correlator engine start and stop times for the correlator integration interval to best fit the reception of the positioning-unit device transmissions.

SYSTEM AND METHOD

Chronologically synchronized positioning-unit devices transmit CDMA positioning signals in a TDMA broadcasting scheme to a position receiver. The position receiver incorporates one or more receive channels, each of which incorporates a TDMA correlator engine. The TDMA correlator engine is comprised of a rapidly configurable pseudo-random number (PRN) code sequence generator, a carrier digitally controlled oscillator (DCO), a channel master timer, and the required accompanying mixers, accumulators, and interfaces to support the operation of the TDMA correlator engine within the position receiver. The TDMA correlator engine provides raw In-phase and Quadrature (I&Q) data samples to a central processing unit (CPU) within the position receiver. The position receiver CPU manages the receive channels, and therefore the TDMA correlator engine, to perform specific correlations at specific times relative to the channel master timer. The sequencing of the TDMA correlator engine in synchronicity with the received TDMA positioning signals is controlled by a TDMA sequence determination means that combines the knowledge of 1) the locations and transmission time slots of the positioning-unit device transmitters, 2) the position and time of the position receiver obtained from a position, velocity, time (PVT) solution, and 3) the state of the channel master timer. In the preferred embodiment, the TDMA sequence determination means comprises a software algorithm that predicts the arrival time of subsequent TDMA positioning signals relative to the channel master timer. In alternative embodiments this process may be distributed to both hardware and software implementations.

DETAILED DESCRIPTIONS OF THE DRAWINGS

Referring now to FIG. 1, there is depicted a simplified TDMA correlator engine 101 of the present invention. The reception of a TDMA positioning signal is provided to the TDMA correlator engine 101 as input data samples 102 from a radio frequency (RF) front-end analog-to-digital converter (ADC). Within the TDMA correlator engine 101 these data samples 102 are supplied to both the In-phase (I) 103 and Quadrature (Q) 104 tracking arms of the TDMA correlator engine 101 and are mixed in the respective carrier mixers 105 & 106 with the In-phase (I) 107 and Quadrature (Q) 108 components of the carrier DCO 109. The outputs of carrier mixers 105 & 106 are subsequently passed to code mixers 110 & 111, which are mixed with the PRN code chip sequence provided by the PRN code sequence generator 112. The outputs of the code mixers 110 & 111 provide correlation values which are subsequently passed to their respective accumulators 113 & 114. The respective accumulation values derived from this process are subsequently dumped to the data bus 115 for further processing by a CPU 116. The carrier DCO 109 and the PRN code sequence generator 112, are controlled by the CPU 116 via the data bus 115. Also provided is a channel master timer 117 which is connected via the data bus 115 to a TDMA sequence determination means 118. The channel master timer 117 provides the timing reference for the TDMA correlator engine 101. The integration interval start and stop times are determined by the TDMA sequence determination means 118 relative to the master channel timer 117 and preferably coincide with the beginning and end of reception of each individual pulse of the TDMA positioning signal. Updates to the carrier DCO 109 and PRN code sequence generator 112 are programmed from the CPU 116 via the data bus 115 prior to the channel master timer 117 reaching the start time of an integration interval. When the channel master timer 117 reaches the programmed start time of the integration interval, the carrier DCO 109 and PRN code sequence generator 112 are reconfigured to the programmed values. At the conclusion of the reconfiguration of the carrier DCO 109 and PRN code sequence generator 112, the channel master timer 117 value is captured and dumped to the data bus 115. The accumulators 113 & 114 are reset to zero, or some other nominal value, synchronous with the updates of the carrier DCO 109 and PRN code sequence generator 112. Once the carrier DCO 109 and PRN code sequence generator 112 are reconfigured and the accumulators 113 & 114 are reset, the accumulation processing of the data samples is initiated.

As data samples are processed, the PRN code sequence generator 112 sequentially loads the appropriate PRN code chip, based on the code phase and code rate programmed by the CPU 116, from a PRN code sequence block memory 119. The sequential PRN code chips are supplied to the respective code mixers 110 & 111 and mixed with the respective carrier mixer 105 & 106 outputs. The correlation values are summed over the integration interval in the accumulation process. When the channel master timer 117 reaches the stop time of the integration interval, the respective accumulators 113 & 114 dump their accumulation values to the data bus 115 for further processing by the CPU 116.

Synchronous with this dump of accumulation values, the channel master timer 117 value is captured and dumped to the data bus 115. At the conclusion of the integration interval, the CPU 116 reads the captured channel master timer 117 values and the accumulated In-phase and Quadrature (I&Q) values from the TDMA correlator engine 101 via the data bus 115. In the preferred embodiment the update rate of the TDMA correlator engine 101 is the same as the TDMA time slot rate of the TDMA positioning signal, although other selected rates fall within the broad scope and ambit of the present invention.

The simplified TDMA correlator engine shown in FIG. 1 only includes a single tracking arm, notionally the Prompt (P) arm. Additional tracking arms are supported within the scope of the present invention. Examples include Early (E), Late (L), and Early-minus-Late (E−L), where the Early (E) or Late (L) arms are placed at one half a CDMA chip spacing from the Prompt (P) arm. Further, tracking arm implementations where the Early (E) and Late (L) arms are at other chip spacings, such as one quarter of a chip, one tenth of a chip, or other convenient or required spacings are also supported. Further, a plurality of tracking arms at arbitrary spacing and density fall within the broad scope and ambit of this invention.

TDMA Correlator Engine Synchronization

Synchronization of the received TDMA positioning signals to the TDMA correlator engine is established by a TDMA sequence determination means that combines the knowledge of 1) the locations and transmission time slots of the positioning-unit device transmitters, 2) the position and time of the position receiver obtained from a position, velocity, time (PVT) solution, and 3) the state of the channel master timer. The key function of the TDMA sequence determination means is to establish the relationship between the receive time of the TDMA positioning signals and the channel master timer. The timing relationship between the channel master timer and the reception of the TDMA positioning signals is determined through the following steps:

1. A coarse timing relationship is determined. The coarse timing relationship between the channel master timer and the reception of the TDMA positioning signals is derived from navigation data bits broadcast in the TDMA positioning signal. The position receiver interrogates the accumulated In-Phase and Quadrature (I&Q) data from the TDMA correlator engine at each integration interval. If a navigation data bit transition occurred during the integration interval, the captured channel master timer values for the start and stop times of the integration interval are stored in CPU memory. Once the channel master timer value of this navigation data bit transition is established, the navigation data bit stream is interrogated to locate the beginning of a data sub-frame. Each data sub-frame contains a positioning-unit device network time stamp at a predetermined location within the data sub-frame. The positioning-unit devices within the synchronized network each transmit synchronous data framing and timing information. When a valid sub-frame of navigation data is decoded, the network time stamp associated with the sub-frame can be directly related to the channel master timer value associated with the start of the sub-frame, thereby establishing the coarse time relationship between the master channel timer and the positioning-unit device network time. This relationship is defined as a coarse time because the common mode time bias within the position receiver and signal propagation delays are not known. The common mode time bias includes clock offsets within the position receiver as well as position receiver delays common to all received signals brought about by the RF components, and any delays in the digital processing. The propagation delays are to-be-determined delays caused by the transmission distances between the positioning-unit devices and the position receiver.

2. A precise timing relationship is determined. Ranging measurements for a plurality of positioning-unit devices are derived from measurement tracking loops running in software on the CPU. The measurement tracking loops are driven by accumulated In-Phase and Quadrature (I&Q) data read from the TDMA correlator engine. The ranging measurements are processed to compute a position, velocity, time (PVT) solution. The time component of the position, velocity, time (PVT) solution is an estimate of the common mode time bias. The TDMA sequence determination means corrects the coarse time estimate with the common mode time bias estimate, thereby providing the position receiver with precise network time.

3. The arrival time of the TDMA positioning signals at the receiver is determined. To determine the arrival time of a TDMA positioning signal, the TDMA sequence determination means establishes the transmission times of TDMA positioning signals relative to the master channel timer. The transmission times are determined from the known TDMA broadcasting scheme and network time of the synchronized position-unit devices. Once the transmission time of the TDMA positioning signals is established, the reception time of the TDMA positioning signals with respect to the master channel timer is determined. The master channel timer value associated with the transmission time is adjusted by the expected propagation delay between the position-unit devices and the position receiver. After adjusting the master channel timer value, the reception time of the TDMA positioning signal is established. The locations of the position-unit devices are provided by the navigation data bit stream and the estimated location of the position receiver is provided by the position, velocity, time (PVT) solution.

4. The above 3 steps are repeated to maintain TDMA synchronization. The position, velocity, time (PVT) solution is continuously updated within the position receiver to allow the TDMA sequence determination means to maintain accurate prediction of the reception time of the TDMA ranging signals with respect to the channel master timer.

Once the TDMA sequence determination means has established the timing relationship between the channel master timer and the reception of the TDMA positioning signals, as described above, the TDMA correlator engine is declared synchronized. Once synchronized, the TDMA sequence determination means maintains synchronization through the tracking and demodulation of the TDMA positioning signals.

TDMA Position Receiver

In the preferred embodiment, the TDMA position receiver is comprised of a conventional RF front-end, a CPU, and one or more receive channels, each receive channel is configured with a TDMA correlator engine. The radio frequency (RF) front-end converts the TDMA positioning signals to an intermediate frequency (IF) for processing in the digital domain. The CPU manages the search and tracking functions of the one or more receive channels and specifically, manages the TDMA correlator engine assigned to each receive channel. Each receive channel is comprised of a mixer to down-convert the IF to baseband, a TDMA correlator engine to demodulate the CDMA positioning signal, and an interface to supply the CPU with CMDA code-specific measurements such as In-phase and Quadrature (I&Q) correlation accumulations. Additionally, the receive channel also provides the CPU with information that is common to all channel operations such as common timer values, counter readings, and status information regarding the state of the each receive channel TDMA correlator engine, and availability of measurements.

In the preferred embodiment the CPU uploads data to the receive channel, and subsequently to the TDMA correlator engine via the data bus, prior to each programmed integration interval. The programmed integration interval is dynamically determined by the TDMA sequence determination means. At the conclusion of each programmed integration interval, the CPU reads the accumulated In-Phase and Quadrature (I&Q) data from the data bus, as well as the captured master channel timer values for the start and stop of the integration interval. The independent provision of receive channel data uploads for each programmed integration interval entails the minimal register set to support the bus interface between the CPU and the position receive channel. To provide receive channel data uploads independently for each programmed integration interval, the CPU must update the receive channel data and read the measurement values at approximately the TDMA time slot rate. For example, in the Radio Technical Commission for Maritime (RTCM) pulsing scheme, this translates into a requirement to service each TDMA receive channel within the position receiver approximately every 91 microseconds.

In an alternative embodiment, the CPU uploads data and reads accumulated In-Phase and Quadrature (I&Q) data from the data bus in a block that incorporates one or more programmed integration intervals. This embodiment reduces the CPU update rate on servicing the receive channel, but does so at the cost of an increased register set on the bus interface between the CPU and TDMA correlator engine. For example, using the Radio Technical Commission for Maritime (RTCM) pulsing scheme, 11 TDMA time slot periods can be programmed and the measurements read simultaneously through 11 separate memory locations within the data bus. This approach reduces the CPU update rate to 1 millisecond but has a larger register memory requirement to store the 11 integration intervals on the data bus concurrently. This embodiment reduces the amount of digital logic required to implement the receiver by reducing the architecture from 11 parallel channel correlators with 11 parallel channels of bus interface to 1 TDMA correlator engine. However, this architecture still requires the equivalent of 11 channels of bus interface between the CPU and the TDMA correlator engine. The above block and pulsing scheme is provided for example purposes only, and is not intended to limit the TDMA broadcasting scheme or the method whereby programming and measurements are collected into program blocks. Other block configurations and pulsing schemes fit within the broad scope and ambit of the present invention.

In the preferred embodiment, the receiver measurement tracking loops for the code and carrier tracking are updated at an integer multiple of the TDMA time slot period. For example, again using the Radio Technical Commission for Maritime (RTCM) pulsing scheme, the PRN repeat period, and therefore the fastest measurement tracking loop update rate that is possible, is 1 millisecond. Each TDMA positioning signal is pulsed-on during $\frac{1}{11}$ of the 1 millisecond PRN repeat period and is not pulsed on again until the next millisecond. Therefore, independent measurements of the TDMA positioning signal are only possible at the 1 millisecond timing level. Measurement tracking loops operate at this 1 millisecond update rate, or a slower rate, depending on the performance requirement of the position receiver. In this example TDMA broadcasting scheme, the receiver software updates all of the tracked TDMA signals tracking loop parameters at a 1 millisecond timer interval. The position receiver may synchronously update the measurement tracking parameters of each of the TDMA positioning signals tracked during the PRN repeat period. Alternatively, the tracking loop software may update the tracking loop parameters at each programmed integration Interval. In this example, the tracking loop software updates each TDMA signal's tracking loop at the completion of the respective integration interval or $\frac{1}{11}$ of a millisecond.

TDMA Correlator Engine Configuration

In the preferred embodiment, a TDMA correlator engine is configured to execute the correlation process on a specific CDMA PRN code during the reception of a TDMA transmission and supply accumulated In-Phase and Quadrature (I&Q) data to the CPU once every programmed integration interval. This allows correlator re-use at a speed determined by the TDMA sequence determination means.

For example, in one embodiment of the present invention a 1023 chip Course/Acquisition CDMA code is transmitted at a rate of 1.023 M-chips/second. This represents a code sequence duration of 1 millisecond. The TDMA broadcasting scheme pulses each CDMA transmitter in a pseudorandom manner such that 93 chips of each code are transmitted from each transmitter in any given millisecond period. This provides eleven TDMA time slots for a network of chronologically synchronized positioning-unit devices, and represents an approximate 9% transmission duty cycle from each transmitter. The transmission pulse periods can vary in duration and also vary in frequency, so long as the sum of all pulses equals the prescribed duty cycle for any given one millisecond period. For example, the pulsing scheme could pulse 20 chips followed by a 100 chip pause, followed by the remaining 73 chips in one given millisecond. Then in the next millisecond period pause 100 chips, pulse 40 chips, pause 200 chips, pulse 30 chips, pause 300 chips, and pulse the remaining 23 chips. Therefore, a TDMA time slot could be as short as possible (twenty chips in this example), or as long as the duty cycle allows, in this case 93 chips (approximately 91 microseconds). The TDMA correlator engine must therefore operate with a variable integration and dump period, with this period being governed by the duration of the currently received TDMA positioning signal.

The TDMA correlator engine is configured to provide the storage of current tracking values in memory, either in the CPU or within the TDMA correlator engine, at the end of a received TDMA time slot. Tracking values are subsequently rapidly initialized for the next programmed integration period. Although there is no continuous tracking mechanism included in the TDMA correlator engine, this rapid storing and initialization of tracking values provides the ability to track a plurality of synchronous TDMA positioning signals utilizing a single TDMA correlator engine. Tracking values stored from previous programmed integration intervals include code and carrier digitally controlled oscillator (DCO) phase and rate as well as the captured master channel timer values for the start and stop times of the integration interval. Predictions of the code and carrier DCO phase and rate values for upcoming programmed integration intervals are computed by:

1. Retrieving the master channel timer value associated with the upcoming programmed integration interval from the TDMA sequence determination means.

2. Predicting the code and carrier DCO values for the upcoming programmed integration interval from the stored tracking values. This prediction is a linear adjustment of the DCO phase based on the change in the master timer value between the previous integration interval and the upcoming programmed integration interval.
3. Adjusting the predicted code and carrier DCO values with corrections supplied by the position receiver tracking loops. The position receiver tracking loops adjust the code and carrier DCO phase and rate values to maintain lock on the received TDMA positioning signal. These adjustments are applied to the predictions to maintain lock on the received TDMA positioning signals.
4. Further correcting the predicted code and carrier DCO values to account for inaccuracies in the master channel timer time-base. In the preferred embodiment, the master channel timer is slaved to the receiver local oscillator (LO). Code and carrier DCO phase measurement errors result from deviations between the position receiver time-base, provided to the position receiver by the receiver local oscillator (LO), and the synchronized positioning-unit devices network time-base. These receiver LO-induced code and carrier DCO phase measurement errors are common to all of the measurements obtained from the plurality of positioning-unit devices. Therefore, this common measurement error is separable from other positioning-unit device-dependent measurement errors. The position receiver tracking loops commonly make the adjustments associated with positioning-unit device-dependent measurement errors as described above. In the preferred embodiment, the correction to the master channel timer time-base is based on a mathematical model managed by software running on the CPU. The mathematical model provides for adjustment of the master channel timer time-base to align with the time-base of the network of positioning-unit devices. In an alternative embodiment, the receiver local oscillator (LO) can be steered to align with the time base of the network of positioning-unit devices.

Setting the Code Phase

The phase of the code DCO must be set at the same time as the other tracking parameters are set in the TDMA correlator engine. A traditional receiver generates the PRN codes that determine the code phase in real time with a series of linear feedback shift registers (LFSR). To change the code phase, the linear feedback shift registers (LFSR) are advanced or held constant providing a relative code phase change with respect to the incoming broadcast signal. With TDMA positioning signals, slewing the code phase generated by a linear feedback shift register (LFSR) to the correct phase for each programmed integration interval is not possible because the time required to change the code phase is typically much longer than the time available in the TDMA time slot period. Therefore a different method for setting the code DCO phase is required in the present invention.

The present invention provides a method and device to rapidly update the code DCO value in synchronism with the incoming TDMA positioning signals. In the preferred embodiment, the PRN code sequences for all of the PRN codes that are to be acquired and tracked by a TDMA correlator engine are pre-computed using a linear feedback shift register (LFSR) and then stored in memory within the position receiver digital logic used to implement the one or more receive channels. The TDMA correlator engine loads the PRN code sequence from memory without the requirement for sequencing of the linear feedback shift register (LFSR). This provides the ability to set the code phase to any desired code phase offset in only the amount of time required to access the memory location. This technique of generating and storing the code sequences in memory has the advantage of requiring a minimal set of hardware to perform the correlation process.

In an alternative embodiment, the TDMA correlator engine is configured with two PRN code generators. One PRN code generator is used for the currently tracked positioning signal received within the current integration interval, whilst the other is pre-set for the subsequent positioning signal received within the subsequent integration interval. This process is continuously alternated, allowing the presetting and switching of the two PRN code generators contained within the TDMA correlator engine. This embodiment reduces the memory requirement at the expense of an additional PRN code generator, but this additional PRN code generator facilitates the rapid reconfiguration of the TDMA correlator engine.

To aid in the process of pre-setting the PRN code generator to the correct tracking values, the linear feedback shift register (LFSR) bit values last used in the tracking arms for each unique PRN code sequence are stored in memory within the CPU. As each PRN code generator is programmed to a pre-determined code and phase value, the previously used bit values are loaded into the linear feedback shift register (LFSR) bit pattern of the pre-set PRN code generator and the linear feedback shift register (LFSR) is then advanced the required amount to set the fractional phase offset to the predicted value. Alternatively, the linear feedback shift register (LFSR) can be reset to a default value between resets.

Figure 2:
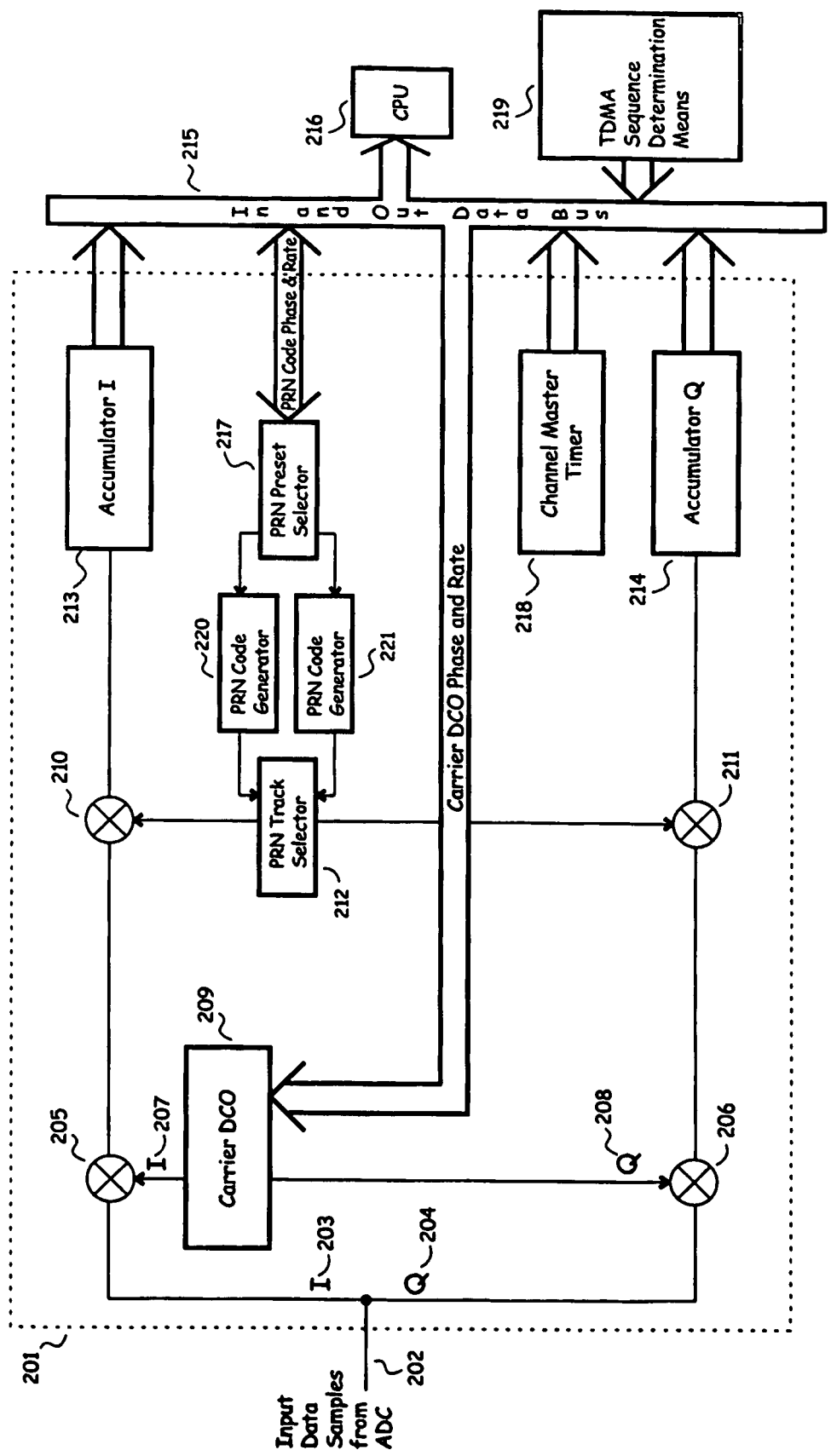
FIG. 2 is a schematic representation of an alternative embodiment of a simplified position receiver channel illustrating a TDMA correlator engine, according to the present invention, further incorporating a PRN Preset Selector, a PRN Track Selector, and two PRN Code Generators.

Referring now to FIG. 2, there is depicted a TDMA correlator engine 201 configured with a switched PRN sequence generator of the present invention. The reception of a TDMA positioning signal is provided to the TDMA correlator engine 201 as input data samples 202 from a radio frequency (RF) front-end analog-to-digital converter (ADC). Within the TDMA correlator engine 201 these data samples 202 are supplied to both the In-phase (I) 203 and Quadrature (Q) 204 tracking arms of the TDMA correlator engine 201 and are mixed in the respective carrier mixers 205 & 206 with the In-phase (I) 207 and Quadrature (Q) 208 components of the carrier DCO 209. The outputs of carrier mixers 205 & 206 are subsequently passed to code mixers 210 & 211, which are mixed with the PRN code chip sequence provided by a PRN track selector 212. The outputs of the code mixers 210 & 211 provide correlation values which are subsequently passed to their respective accumulators 213 & 214. The respective accumulation values derived from this process are subsequently dumped to the data bus 215 for further processing by a CPU 216. The carrier DCO 209 and a PRN code preset selector 217, are controlled by the CPU 216 via the data bus 215. Also provided is a channel master timer 218 which is connected via the data bus 215 to a TDMA sequence determination means 219. The channel master timer 218 provides reference timing for the TDMA correlator engine 201. The integration interval start and stop times are determined by the TDMA sequence determination means 219 relative to the master channel timer 218 and preferably coincide with the beginning and end of reception of the TDMA positioning signal. A first PRN code generator 220 and a second PRN code generator 221 are configured with the PRN code preset selector 217. The PRN track selector 212 is configured to alternatively select the output of the first PRN code generator 220 or the second PRN code generator 221 in synchronicity with the start time of each integration interval, as determined by the TDMA sequence determination means 219. Prior to the channel master timer 218 reaching the programmed start time of an integration interval, the PRN code preset selector 217 programs the PRN code for the next integration interval into whichever of the PRN code generators 220 or 221 is not currently selected by the PRN track selector 212. For illustrative example, during the current integration interval the output of first PRN code generator 220 is selected by PRN track selector 212 as input to the code mixers 210 & 211. Concurrently, the CPU 216 directs the PRN code preset selector 217 to pre-configure the second PRN code generator 221 with the correct PRN code required for the next integration interval. This pre-configuration also includes the process of slewing the PRN code to the correct starting position required in that next integration interval. This process is alternated each time the TDMA sequence determination means 219 determines the start time of a subsequent integration interval, although other selected intervals fall within the broad scope and ambit of the present invention.

The simplified TDMA correlator engine shown in FIG. 2 only includes a single tracking arm, notionally the Prompt (P) arm. Additional tracking arms are supported within the scope of the present invention. Examples include Early (E), Late (L), and Early-minus-Late (E-L), where the Early (E) or Late (L) arms are placed at one half a CDMA chip spacing from the Prompt (P) arm. Further, tracking arm implementations where the Early (E) and Late (L) arms are at other chip spacing, such as one quarter of a chip, one tenth of a chip, or other convenient or required spacings are also supported. Further, a plurality of tracking arms at arbitrary spacing and density fall within the broad scope and ambit of this invention.

Acquisition of TDMA Positioning Signals

At position receiver start-up, the position receiver may not have sufficient information to transition directly into a synchronized mode of operation. In these cases, the position receiver acquires and tracks TDMA positioning signals from a synchronized network of positioning-unit devices to achieve synchronization. To begin the TDMA synchronization process, the position receiver initializes a global search and acquires a single unique TDMA positioning signal transmitted from one of the positioning-unit devices in-view. At this stage of the search process, the network time and the TDMA broadcasting sequence of the TDMA positioning signals Is not known. Therefore, the TDMA correlator engine Is programmed to continuously correlate on the single unique TDMA positioning signal. During this stage of acquisition, the position receiver interrogates the navigation data transmitted from the acquired positioning-unit device to determine positioning-unit device transmission time, and the TDMA broadcasting sequence. The transmitted navigation data also provides information on other positioning-unit devices in-view and their respective PRN codes and TDMA broadcasting sequences (i.e. their transmission time slots). Once the first TDMA positioning signal has been acquired and the navigation data interrogated, the position receiver can determine a coarse network time from the navigation data. The combination of coarse network time and the PRN code delay offset of the received TDMA positioning signal provide the timing information required for a coarse synchronization of the TDMA correlator engine to the receive time of the transmitted signal. This coarse synchronization results in the position receiver correlating substantially on the received TDMA positioning signal. Before acquiring a second unique TDMA positioning signal, the tracking parameters for the first TDMA positioning signal are stored in position receiver memory, such as in the CPU memory. The TDMA correlator engine switches back to the first TDMA positioning signal when it next occurs in the TDMA broadcasting sequence by loading the previously stored tracking information from CPU memory and predicting the tracking values for this subsequent integration period, therefore bypassing the acquisition and search process.

In the preferred embodiment, once coarse time alignment is achieved using the first acquired positioning-unit device positioning signal, the single channel TDMA correlator engine reverts to a synchronized mode of operation. Synchronized mode successively searches, acquires, and tracks all positioning devices in-view from information acquired from the first positioning-unit device. The first positioning-unit device passes information regarding the PRN codes and TDMA time slots of all nearby positioning-unit devices to the position receiver via the navigation data. The position receiver uses this information to synchronize its one or more TDMA correlator engines to the network TDMA broadcasting scheme and quickly acquire and track all positioning-unit devices in-view. In this preferred embodiment, time within ten microseconds will be adequate for initial coarse TDMA slot alignment.

In an alternative embodiment, to acquire a second unique TDMA positioning signal in-view, the position receiver utilizes the navigation data acquired from the first TDMA positioning signal to subsequently determine which PRN code to search for. The TDMA correlator engine is then configured to track the first unique TDMA positioning signal during its time slot, using the tracking information stored in CPU memory, and the second unique TDMA positioning signal during the remaining time slots. When the second TDMA positioning signal is acquired and the navigation data is interrogated, the tracking parameters for the second TDMA positioning signal are stored in the position receiver CPU memory. The TDMA correlator engine switches back to the second TDMA positioning signal whenever it occurs in the TDMA broadcasting sequence by loading the tracking information stored in CPU memory and predicting the tracking values for this subsequent integration period, again bypassing the acquisition and search process. This process is repeated through all available TDMA time slots, or until all of the available TDMA positioning signals are acquired and tracked, allowing the computation of a position, velocity, and time (PVT) solution.

Alternatively, once a first TDMA positioning signal is acquired and the navigation data interrogated, coarse network time may be sufficient to establish the timing of the received TDMA positioning signals without requiring the position receiver to compute a full position, velocity, and time (PVT) solution. For example, if the network of chronologically synchronized positioning-unit devices were known to all be within 10 kilometers of the position receiver, then the maximum propagation delay would be limited to approximately 33 microseconds. In a Radio Technical Commission for Maritime (RTCM) pulsing scheme, each pulse time slot occupies 91 microseconds. Therefore, in this case, the maximum relative propagation delay would result in at most missing 33 of the 91 microseconds of the TDMA positioning signal, leaving 58 microseconds of TDMA positioning signal to correlate against. Although the missed signal will result in a lowered signal-to-noise ratio (SNR), the overall correlation power loss from the missed signal is less than 2 dB. Using the available knowledge of the relative location of the position receiver and the location of the chronologically synchronized positioning-unit devices, transition to a fully synchronous mode may occur at any time during the acquisition and tracking process when the time of arrival of the TDMA positioning signals is sufficient to meet the tracking requirements of the position receiver. Furthermore, as the TDMA positioning signals are acquired, tracked, and their navigation data interrogated, the knowledge of network time and the received time of each TDMA positioning signal is refined to further mitigate the cross-correlation effect and increase the SNR, thereby increasing the position receiver performance.

Disparate ranges to the positioning-unit devices is only one of many examples of the physical phenomena which cause received TDMA positioning signals to be in an off-nominal time slot. Other physical phenomena that cause off-nominal reception include synchronization errors within the positioning-unit devices, atmospheric delay contributing to the propagation delays, multipath, and other effects. Using the above described acquisition techniques, any combination of these apparent propagation delay effects can be mitigated.

Normally, the acquisition process is continued until sufficient unique TDMA positioning signals are acquired and tracked to compute a position, velocity, and time (PVT) solution. The position, velocity, and time (PVT) solution can be computed at any time during the acquisition process when at least 3 TDMA positioning signals have been acquired. The position, velocity, and time (PVT) solution is required to estimate the so-called common mode time bias within the position receiver. Once the common mode time bias is estimated, the position receiver computes a precise estimate of network time. This precise network time estimate is a combination of the coarse network time provided by the interrogation of the navigation data, the common mode time bias, and positioning signal propagation delays from the network of positioning-unit devices. Precise network time allows the synchronization of the master channel timer with the now known network time of the positioning-unit devices.

Accurate location and time can be determined by the position receiver by performing a position, velocity and time (PVT) solution while the single channel TDMA correlator engine is chronologically synchronized with the TDMA network. A significant improvement in received signal-to-noise ratio (SNR) is observed due to the TDMA correlator engine only integrating on a particular PRN code when the respective positioning signal is being received. That is, the TDMA correlator engine does not integrate unwanted noise and other PRN codes when the positioning-unit device signal of interest is not being received. Furthermore, cross-correlation artifacts are significantly mitigated, or eliminated entirely, due to the TDMA correlator engine not integrating PRN codes that are transmitted from other positioning-unit devices.

In the preferred embodiment, the channel master timer roll-over period is longer than the full sequence TDMA repeat period and the resolution of the channel master timer is as fine, or finer than, the resolution of the tracking code and carrier DCOs. Other channel master timer implementations are also possible, but they either require additional components to monitor the timer rollovers or they increase the measurement noise.

Clock Stability

The overall stability of the position receiver local oscillator (LO) used to drive the TDMA correlator engine will be a determining factor in the resulting measurement accuracy of the present invention. Traditional position receivers use continuously running code and carrier DCO counters to accommodate variations in the position receiver local oscillator (LO). In the present invention, the stability of the position receiver local oscillator (LO) is a key factor in predicting the code and carrier DCO values based on the programmed settings, and the channel master timer value. In the preferred embodiment, the position receiver local oscillator (LO) is used as the reference for the master channel timer.

The position receiver local oscillator (LO) must be stable over the prediction period of the measurements. In the preferred embodiment, this stability time is roughly the TDMA sub-sequence repeat period. In the Radio Technical Commission for Maritime (RTCM) pulsing scheme the TDMA sub-sequence repeat period is 1 millisecond, therefore requiring position receiver local oscillator (LO) stability over approximately 1 millisecond of measurement prediction time. A typical Temperature Controlled Oscillator (TCXO), commonly used for the position receiver local oscillator (LO), has a short term stability of approximately 1 part in $10^{-9}$ over 1 second. Over a period of 1 millisecond, a 1 part in $10^{-9}$ deviation results in a position receiver local oscillator (LO) timing error of $10^{-12}$ seconds, or a channel master timer range error of approximately 0.03 millimeters. A range error of 0.03 millimeters is sufficient for many position receiver applications. Should more precise range measurements be required, averaging or other mathematical equivalent techniques may be employed. If these techniques are not sufficient, higher quality position receiver local oscillator (LO) components such as an Oven Controlled Oscillator (OCXO) or an atomic lime standard may be used. In the preferred embodiment, a Temperature Controlled Oscillator (TCXO) is used for the position receiver local oscillator (LO). The expected measurement error resulting from estimating phase of a positioning signal is typically on the order of 1% of the carrier wavelength of the broadcast signal. For a positioning-unit device transmitting at 2.4 GHz, 1% of the carrier wavelength is approximately 1.2 millimeters. Therefore, the 0.03 millimeters of measurement noise added by the position receiver local oscillator (LO) induced error into the prediction process is well below the core measurement noise in the positioning system error budget.

TDMA Broadcasting Sequence Determination

In the preferred embodiment, the TDMA broadcasting sequences are associated with the positioning-unit device PRN codes, and are preferably generated in real time within the position receiver through the use of an algebraic formula, a linear feedback shift register (LFSR), or any other convenient mathematical equivalent. In this embodiment the position receiver determines the transmitted TDMA broadcasting sequences by associating a received PRN code, and network time, with a predetermined TDMA broadcasting sequence. This allows fast TDMA correlator engine synchronization with the acquisition of a first positioning-unit device. Subsequent positioning-unit device PRN codes that occur in the subsequent time slots are then determined by pre-loaded, or mathematically established relationships, between the PRN code and the TDMA time slot. Alternatively, the TDMA broadcasting sequence could be pre-determined through a similar mathematical process and loaded into non-volatile memory within the position receiver.

In an alternative embodiment, the TDMA broadcasting sequences are supplied in the navigation messages transmitted from the positioning-unit devices and are not specifically associated with the PRN codes. As an example implementation of this technique, the transmitted TDMA broadcasting sequence of a first positioning-unit device is incorporated in its navigation message. A second positioning-unit device, within range of the first positioning-unit device, receives the navigation data that includes the first TDMA broadcasting sequence of the first positioning-unit device. The second positioning-unit device broadcasts its TDMA broadcasting sequence in its navigation message, and also includes the PRN code and TDMA broadcasting sequence of the first positioning-unit device. A third positioning-unit device, within range of both the first and second positioning-unit devices, receives the navigation data from the first and second positioning-unit device that includes their respective TDMA broadcasting sequences. The third positioning-unit device broadcasts its TDMA broadcasting sequence in its navigation message and also includes the PRN code and TDMA broadcasting sequences of the first and second positioning-unit devices in its navigation message. This process continues until all of the positioning-unit devices within view of each other are broadcasting the PRN code and TDMA broadcasting sequences of each other. The above described structure is similar to the Global Positioning System (GPS) system so-called almanac data where each satellite broadcasts a set of position information for itself, as well as for the remainder of the satellite constellation. In this embodiment, the position receiver determines the TDMA broadcasting sequences of all positioning-unit devices in-view by interrogating the navigation message from at least one positioning-unit device.

Propagation Delay

As the distance between a positioning-unit device and a position receiver increases, the propagation delay of the transmitted TDMA positioning signal increases accordingly. This leads to the transmitted TDMA positioning signal not being received entirely within the nominal position receiver time slot. This is of no consequence when all positioning-unit devices are equidistant from a position receiver because the time slots will be equally biased relative to network time. However, when positioning-unit devices vary significantly in distance from the position receiver, overlaps in reception times of the TDMA positioning signals occur. As the position receiver location changes, a deterministic algorithm considers the propagation delay from each positioning-unit device and adjusts the TDMA correlator engine synchronization to best fit the reception times of the positioning-unit device transmissions. This variable correlation timing process requires the dynamic adjustment of the integration interval start and stop times. For illustrative example, a position receiver is located 10 kilometers from a first positioning-unit device and 100 meters from a second positioning-unit device. The propagation delay from the first positioning-unit device is in the order of 30 microseconds, whereas the propagation delay from the second positioning-unit device is in the order of 300 nanoseconds. If these two devices are pulsing in adjacent 91 microsecond TDMA time slots, with the first devices' pulses preceding the second devices' pulses, the position receiver will experience a pulse overlap of approximately 29.7 microseconds. Given this information, the position receiver may adjust its integration interval start and stop times in any way which maximizes the received correlation power value during any given integration interval. The exact adjustment method implemented within a position receiver will depend on the performance requirements of the position receiver and the specific off-nominal TDMA signal reception timing.

Furthermore, ranges to the positioning-unit devices is only one of many examples of the physical phenomena which cause received TDMA positioning signals to be received outside of the nominal time slots allocated by the position receiver. Other physical phenomena, such as a lack of synchronization between the transmission timing of the positioning-unit devices, propagation delays such as atmospheric distortion or delay of the signal, ground effects, or multipath could also cause the received TDMA positioning signals to arrive outside of the nominal receive time slot. The technique described above of adjusting the integration interval start and stop times may be adapted to mitigate any of these effects.

Multiple Channels Incorporating TDMA Correlator Engines

The above described overlap problem can be rectified in a further embodiment of the present invention by providing a position receiver with a plurality of receive channels incorporating TDMA correlator engines. As two pulses overlap in time, two channels can simultaneously track both PRN codes, providing that any of the previously described near/far constraints can be overcome. A plurality of receive channels incorporating TDMA correlator engines also provides the capability to track multiple PRN codes that are transmitted in the same TDMA time slot.

Referring again to the Radio Technical Commission for Maritime (RTCM) pulsing scheme, a single channel TDMA correlator engine can simultaneously track TDMA positioning signals from 11 unique chronologically synchronized positioning-unit devices wherein one CDMA positioning signal is broadcast in each TDMA lime slot. A two channel position receiver with the above described TDMA correlator engine architecture may simultaneously track TDMA positioning signals from 22 unique chronologically synchronized positioning-unit devices, wherein 2 CDMA positioning signals are broadcast in each TDMA time slot. This process can be generalized to any number of channels incorporating TDMA correlator engines.

This specification has used the Radio Technical Commission for Maritime (RTCM) pulsing scheme as a common example of a pulsing scheme well documented in TDMA positioning systems. However, any TDMA broadcasting scheme falls into the broad scope and ambit of the present invention.

It will of course be realized that whilst the above has been given by way of an illustrative example of this invention, all such and other modifications and variations hereto, as would be apparent to persons skilled in the art, are deemed to fall within the broad scope and ambit of this invention as is herein set forth.

What is claimed is:

1. A method of sequentially receiving a plurality of TDMA positioning signals broadcast in a known TDMA sequence, the method comprising:
   a) deploying a position receiver containing:
      i) means to receive and interpret said TDMA positioning signals;
      ii) at least one correlator communicatively coupled to said position receiver, each correlator configured with:
         I. means for providing a master timing reference for said correlator;
         II. means to analyse the relationship between the reception time of the TDMA positioning signals and said master timing reference, and subsequently determine the start and stop times of the correlator integration interval relative to said master timing reference;
         III. means to sequentially generate a next PRN (pseudo-random number) code of the known TDMA sequence responsive to said determined start and stop times;
   b) receiving at least one TDMA positioning signal at said position receiver and determining said reception time of said TDMA signals;

c) communicating said determined reception time to said at least one correlator, thereby generating a PRN sequence in synchronicity with the reception of said TDMA positioning signals.

2. A method according to claim 1, wherein said means to receive and interpret said TDMA positioning signals further comprises a TDMA sequence determination means configured to synchronize the received plurality of TDMA positioning signals to said at least one correlator, each of said at least one correlator correlating on a specific pseudo-random code during the reception of each of said plurality of TDMA positioning signals.

3. A method according to claim 1, further comprising the step of adjusting said generation of a PRN sequence by said at least one correlator to best fit the reception of said TDMA positioning signals.

4. A method according to claim 1, further comprising the steps of:
   a) acquiring a first unique TDMA positioning signal and continuously correlating on said first unique TDMA positioning signal;
   b) interrogating navigation data incorporated within said acquired first unique TDMA positioning signal to:
      i) determine the transmission time of said first unique TDMA positioning signal; and
      ii) determine said TDMA broadcast sequence;
   c) sequentially processing said first unique TDMA positioning signal and subsequent TDMA positioning signals in synchronization with said determined transmission time and said determined TDMA broadcast sequence.

* * * * *